March 16, 1926.

G. L. TARBOX

UNIVERSAL JOINT

Filed Dec. 10, 1924

GURDON LUCIUS TARBOX
INVENTOR

ATTORNEY

Patented Mar. 16, 1926.

1,577,268

UNITED STATES PATENT OFFICE.

GURDON LUCIUS TARBOX, OF NORTH PLAINFIELD, NEW JERSEY.

UNIVERSAL JOINT.

Application filed December 10, 1924. Serial No. 755,021.

*To all whom it may concern:*

Be it known that I, GURDON LUCIUS TARBOX, a citizen of the United States, residing in North Plainfield, in the county of Somerset, State of New Jersey, have invented certain new and useful Improvements in Universal Joints, of which the following is a disclosure.

My invention relates to universal joints such as are employed to connect rotatable power shafts of all kinds, and particularly to universal joints used on propeller shafts of automobiles, and has for its object to provide a commercial joint which will not throw oil and run dry.

The lubrication of universal joints rotating at constant speed is a simple matter but this assumes a difficult problem when the joint is run at varying speeds with intermittent stops. It is at the position of rest where the lubricant is drained away from the joint and after a limited number of stops, is lost and the oil reservoirs become dry destroying the bearing. The joint hereinafter described is designed upon a new principle and that is to provide an oil tight lubricating reservoir outside of each journal adapted to receive and retain the oil or lubricant which is delivered to it by centrifugal force while the joint is in motion and while at rest release only a small portion of the oil or lubricant to be fed to the journals to lubricate them for their next interval of running, the excess oil being delivered to the oppositely disposed lubricating reservoir where it is retained and not lost, which constitutes a system whereby the lubricant is equally distributed between the reservoirs, preventing any one reservoir from running dry and thereby destroy the bearing.

The foregoing and other features of my invention will now be described in connection with the accompanying drawings forming part of this disclosure in which I have represented my universal joint in its preferred form after which I shall point out more particularly in the claims those features which I believe to be new and of my own invention.

In the accompanying drawings forming part of this specification:

Figure 3 an end view of the journal bearing.

Figure 4:
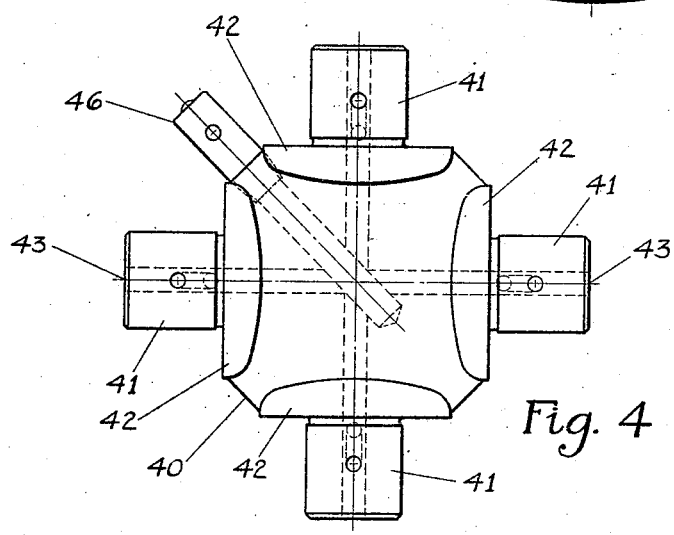

Figure 4 is a detail of the journal trunnion.

Figure 5 is a sectional detail of the journal bushing employed.

In the carrying out of my invention I employ a flanged member 10 and a spline member 20 each provided with two journal bearings 30 which are mounted on a trunnion 40 and which provide the universal movement desired. It will be readily understood that two flanged members or two splined members may be also connected in this manner if desired. I have shown one of each type as this construction is common automotive practice.

The flanged member 10 is provided with a circular flange 11 adapted to be secured to a similar flange of a driven or driving member, not shown, and a cross piece 12 provided with two holes 13 each adapted to receive and hold the stud 31 of a journal bearing.

The spline member 20 is also provided with a cross member 22 which is in turn provided with two holes 23 each adapted to receive and hold stud 31 of a journal bearing.

The journal bearings 30 are provided with an extension or stud 31 and means for securing them to the cross member of the flange member and the spline member. A hole 32 at right angles to the stud passes through the journal housing. This hole is ground and a bushing 50 fitted therein. An annular space 33 is provided in the housing to accommodate the flange 51 of the bushing and the packing ring 60 which is preferably made of cork but any type of packing suitable for the purpose may be used. In the opposite end of the bearing an annular space 34 is provided into which extends the end of the bushing 50. A plate 35 is sweated into a chase way provided for the purpose or the bearing housing may be turned up over the plate as shown making an oil tight joint. It will be noticed that the plate 35 contacts with the ends of the bushing 50 and that semi-circular slots 52 are cut into the bushing so that the lubricant may flow from the annular ring to the center portion above the journal pin.

It will be readily understood that with this construction the bearing will comprise an annular shaped reservoir for the lubricant beyond the end of the journal and that the lubricant cannot run out of any of the joints.

Figure 1:
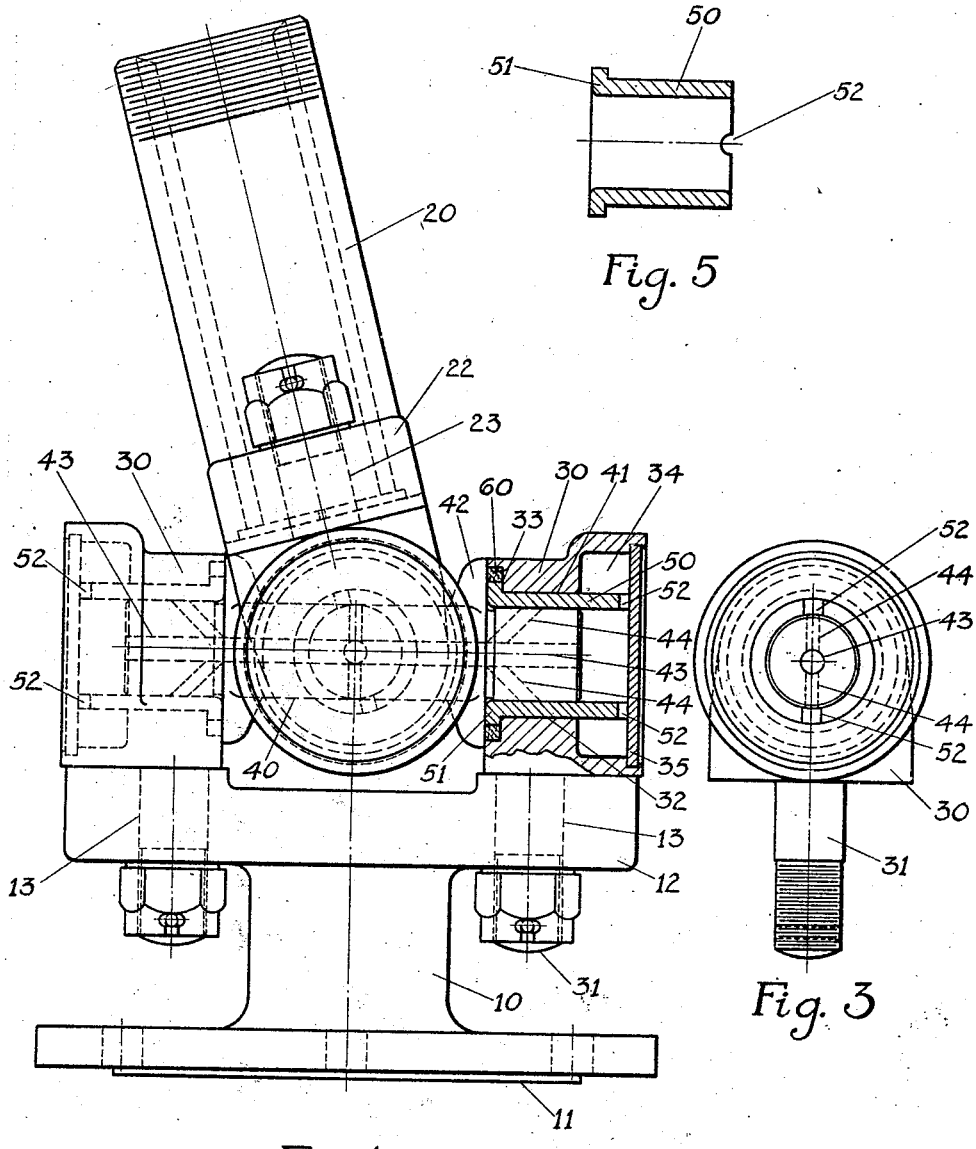
Figure 1 is a side elevation of my universal joint in part section.
Figure 2:
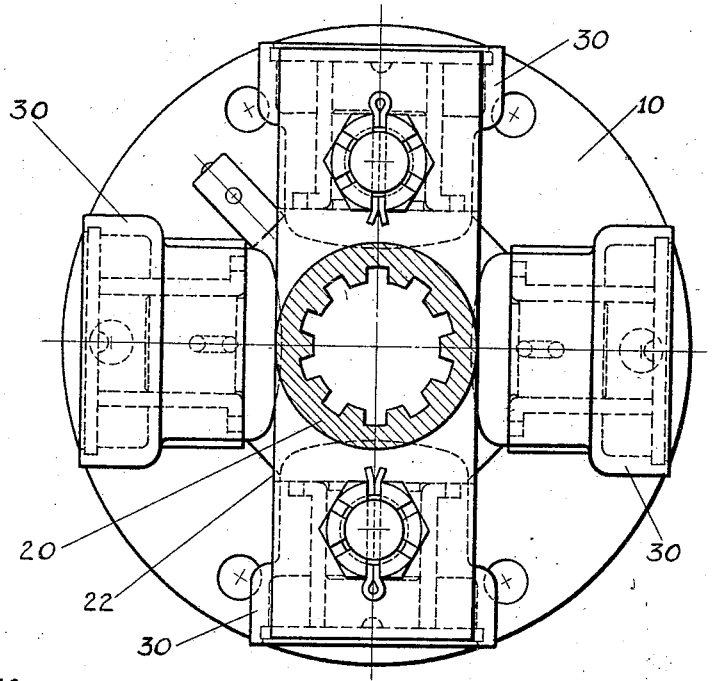
Figure 2 is an end view thereof with the spline member in section.

The journal trunnion 40 comprises four journal pins 41 each provided with suitable shoulders 42. Holes 43 for the lubricant extend through the pins and are connected with each other in the center of the block. A lubricating means 46 is provided to deliver the lubricant to the center of the trunnion. It will be observed by referring to Figure 1 that these holes 43 have diverging branches 44 extending to the surface of the journal pins at approximately 45° with the through holes.

It will be at once apparent that when the joint is connected up ready for use and filled with oil or lubricant through the plug 46 and as soon as centrifugal force takes effect the lubricant will fly out to the annular space beyond the journal pins where it is encased and held there for future use. As soon as the joint is stopped the oil or lubricant which is in the center portion of the annular reservoir will flow through the hole 43 into the oppositely disposed reservoir, lubricating the pins as it flows because of the small amount of oil that is conducted through the branches 44. No oil flows out between the pin 41 and the bushing because only a small quantity arrives at that place and as it is not under pressure it is retained there by surface tension.

I wish it distinctly understood that my universal joint herein described and illustrated is in the form in which I desire to construct it, but that changes or variations may be made as may be convenient or desirable without departing from the salient features of my invention and I therefore intend the following claims to cover such modifications as naturally fall within the lines of inventions.

I claim:

1. A universal joint comprising a driving and driven member journaled at right angles to each other to a trunnion block, circular lubricant reservoirs located beyond the end of the journal pins, annular reservoirs surrounding each circular reservoir and connected thereto, said trunnion block provided with communicating passage connecting the reservoirs with each other.

2. A universal joint comprising a driving and driven member journaled to a trunnion block provided with four journal pins, circular lubricant reservoirs located beyond the end of the journal pins, annular reservoirs surrounding each circular reservoir and connecting therewith, said trunnion block provided with communicating passages connecting the reservoirs, means to fill the lubricant chambers through the center of the trunnion block.

3. A universal joint comprising a driving and driven member journaled to a trunnion block provided with journal pins, journal bearings provided with a lubricant chamber outside the journal pins, journal bushings extending beyond the journal pins into the lubricant chambers forming an annular reserve space to retain the lubricant, and a circular space to supply the lubricant.

4. In a universal joint annular lubricant reservoirs coaxial with and extending beyond the journal, circular reservoirs within the annular reservoirs and connected therewith.

5. In a universal joint annular lubricant reservoirs coaxial with and extending beyond the journals, circular reservoirs within the annular reservoirs and communicating therewith, a journal block provided with communicating passages connecting the reservoirs with each other.

6. In a universal joint a journal bearing comprising means to secure it to a driving or driven member, a lubricant reservoir whose diameter is larger than the diameter of the journal, and located beyond the end thereof, a bushing extending beyond the journal and into the lubricant reservoir dividing the lubricant reservoirs into two chambers.

7. In a universal joint a journal bearing comprising a lubricant reservoir whose diameter is larger than the diameter of the journal and located beyond the end thereof, said lubricant chamber closed at its outer end, a bushing extending beyond the journal and into the lubricant reservoir forming an annular ring and a circular chamber, bushings provided with passages connecting the annular ring and the circular chamber.

8. In a universal joint a journal bearing comprising a housing provided with a hole extending therethrough, said hole being enlarged at both ends, a bushing ground to tightly fit the hole, provided with a flange on one end, a packing washer together with the flange adapted to fill the enlarged portion of the hole on one end, the opposite end of the bushing extending into the other enlarged portion of the hole dividing it into two reservoirs, a closure plate closing the outer ends of the reservoirs.

9. In a universal joint of the type described two lubricant reservoirs beyond the end of each journal bearing, closed on the outer ends and connected together by communicating passages extending through the dividing wall, one reservoir to supply the lubricant to bearing when the joint is at rest and the other reservoir adapted to retain the lubricant when the joint is at rest and supply the other reservoir with lubricant while joint is in motion.

10. In a universal joint of the type described a lubricant reservoir beyond the end of each journal bearing said reservoirs being closed on the outer end thereof, a journal bushing extending into the reservoir beyond the journal dividing the reservoir into two reservoirs, said bushing provided with passages connecting the two reservoirs.

In witness whereof I affix my signature.

GURDON L. TARBOX.